US012640509B2

(12) United States Patent
Störi et al.

(10) Patent No.: US 12,640,509 B2
(45) Date of Patent: May 26, 2026

(54) ELECTRIC CONTACT, IN PARTICULAR FLAT CONTACT OR BIFURCATED CONTACT

(71) Applicant: Stäubli Electrical Connectors AG, Allschwil (CH)

(72) Inventors: Reto Störi, Allschwil (CH); Andreas Linder, Röschenz (CH); Andrea Mastrovito, Münchenstein (CH); Aurélien Hell, Ligsdorf (FR)

(73) Assignee: STÄUBLI ELECTRICAL CONNECTORS AG, Allschwil (CH)

( * ) Notice: Subject to any disclaimer, the term of this patent is extended or adjusted under 35 U.S.C. 154(b) by 531 days.

(21) Appl. No.: 18/042,676

(22) PCT Filed: Aug. 17, 2021

(86) PCT No.: PCT/EP2021/072824

§ 371 (c)(1),
(2) Date: Feb. 23, 2023

(87) PCT Pub. No.: WO2022/043133

PCT Pub. Date: Mar. 3, 2022

(65) Prior Publication Data

US 2023/0369795 A1 Nov. 16, 2023

(30) Foreign Application Priority Data

Aug. 27, 2020 (CH) .................................... 01063/20
Aug. 27, 2020 (EP) .................................... 20193103

(51) Int. Cl.
*H01R 13/187* (2006.01)
*H01R 43/16* (2006.01)

(52) U.S. Cl.
CPC ........... *H01R 13/187* (2013.01); *H01R 43/16* (2013.01)

(58) Field of Classification Search
CPC .. H01R 13/17–187; H01R 13/424–428; H01R 4/4854–4881

(Continued)

(56) References Cited

U.S. PATENT DOCUMENTS 8,764,495 B2 * 7/2014 Ahangar ............. H01R 13/052 439/825
2010/0093230 A1 * 4/2010 Ledermann .......... H01R 13/187 439/842

(Continued)

FOREIGN PATENT DOCUMENTS

CN 106654608 A 5/2017
CN 208256968 U 12/2018

OTHER PUBLICATIONS

International Search Report of PCT/EP2021/072824 dated Nov. 2, 2021 [PCT/ISA/210].

*Primary Examiner* — Abdullah A Riyami
*Assistant Examiner* — Amara Anderson
(74) *Attorney, Agent, or Firm* — Sughrue Mion, PLLC

(57) ABSTRACT

An electric contact has a first conductive element, an electric connection element for contacting the first element, and a holding element for holding the connection element on the first element, in which a recess is provided. At least one holding element is provided which has a greater height than the height of the holding groove in the recess. The at least one holding element is positioned at or within a specified distance in front of the front most positioning section of the connection element in one of the holding grooves, and if the recess is a T-shaped cutout, at least one holding element is analogously positioned behind the rearmost positioning section of the connection element in the counter insertion direction.

19 Claims, 8 Drawing Sheets

(58) Field of Classification Search
USPC .......................................................... 439/816
See application file for complete search history.

(56) References Cited

U.S. PATENT DOCUMENTS

| | | | | |
|---|---|---|---|---|
| 2014/0030934 | A1* | 1/2014 | Wirth .................. | H01R 13/112<br>439/816 |
| 2015/0333442 | A1* | 11/2015 | Naganuma ............ | H01R 12/91<br>439/121 |
| 2017/0093069 | A1* | 3/2017 | Koyama .............. | H01R 13/187 |
| 2018/0219305 | A1* | 8/2018 | Wavering ............ | H01R 13/187 |

* cited by examiner

ELECTRIC CONTACT, IN PARTICULAR FLAT CONTACT OR BIFURCATED CONTACT

CROSS REFERENCE TO RELATED APPLICATIONS

This application is a National Stage of International Application No. PCT/EP2021/072824 filed on Aug. 17, 2021, claiming priority based on European Patent Application No. 20193103.7 filed on Aug. 27, 2020 and Swiss Patent Application No. 01063/20 filed on Aug. 27, 2020.

TECHNICAL FIELD

The present invention relates to an electrical contact, especially a flat contact or a bifurcated contact, having a first conductive element, having at least one electrical connection element for contacting of the first conductive element and configured for contacting of a second conductive element which can be supplied and having at least one holding member for holding the electrical connection element or elements on the first conductive element, wherein the first conductive element has at least one T-shaped incision in the surface facing toward the second conductive element which can be supplied, wherein the electrical connection element or elements has or have a first contact section for contact with the first conductive element in the T-shaped incision and a second contact section for contact with the second conductive element which can be supplied outside the T-shaped incision.

PRIOR ART

US 2017/093069 A1 relates to an electrical contact having a plurality of electrical connection elements for contacting both a first conductive element and a second conductive element and having a holding member for holding the electrical connection elements. Each of the electrical connection elements contains a first contact section for contact with the first conductive element, a second contact section for contact with the second conductive element, and a holding section which is held between the first contact section and the second contact section and with the holding member. For this, holes of small diameter are formed in the bottom of a groove on the first conductive element so that they penetrate through from the outer upper and lower surface to a receiving groove in the bottom of the groove. The holes with small diameter are provided at a location near the two side surfaces of the first conductive element in proximity to the ends of the protruding flange sections of the groove. Engagement pins are situated in the holes with small diameter, being introduced from the outer upper and lower surfaces.

CN 10 665 46 08 A describes an elastic electrical connector. The elastic electrical connector comprises a base and a receiving clamp, wherein the base and the receiving clamp are hinged together. The receiving clamp accommodates an electrical contact piece, which piece has round free ends that are situated in a hollow cylindrical cavity and are closed off at both ends by two cylindrical plugs with flange, wherein the plug is pressed into the receiving clamp as a holding member.

CN 20 825 69 68 U describes an elastic electrical connector, including a base, on which half-shells situated on opposite sides project at the top, and the round webs of a connection element can be inserted in them, being closed off at all free ends of the half-shells by a terminal flange as a holding member.

SUMMARY OF THE INVENTION

Starting from this prior art, the object of the invention is the provision of an electrical connector in which the holding member holds the electrical connection element or elements better and the connection elements do not fall out.

Moreover, with the present invention it can be ensured that a free play is adjustable for the electrical connection elements.

An electrical contact has a first conductive element, an electrical connection element, usually designed as a group of interconnected lamellas, for the contacting of the first conductive element and configured for contacting of a second conductive element which can be supplied, and at least one holding member for holding the electrical connection element on the first conductive element, wherein the first conductive element comprises at least one incision in the surface facing toward the second conductive element which can be supplied, wherein the electrical connection element has at least one frontmost and one rearmost positioning section, which are identical in the case of a single lamella/contact section, for positioning of the first conductive element in an assigned holding groove of the incision and a contact section for contact with the second conductive element which can be supplied outside the incision. There are then provided one to four holding members, wherein one is sufficient in a blind hole design and two are sufficient in a continuous groove design, each of them having a greater height than the height of the holding groove(s) of the incision assigned to them, while at least one holding member is positioned at or within a predetermined distance in front of the frontmost positioning section of the electrical connection element in one of the holding grooves, and either at least one holding member is positioned at or up to a predetermined distance behind the rearmost positioning section of the electrical connection element in one of the holding grooves or one of the holding grooves is a blind hole groove having a rear wall and the rearmost positioning section of the electrical connection element is positioned at a predetermined distance in front of the rear wall of the blind hole groove in this blind hole groove.

The positioning mentioned here at a predetermined distance in front of or behind the frontmost or rearmost positioning section is seen in the insertion direction or in the counter insertion direction of the electrical connection element in a continuous holding groove. The pressing of the holding member into the holding groove can then be done in the direct insertion direction or the counter insertion direction, which means that a tool presses the holding member directly into the recess and pushes it forward to the prescribed position.

The positioning of the electrical connection element in the insertion direction or in the counter insertion direction can also be done alternatively by pressing the holding member into the holding groove from the side of the insertion direction or the counter insertion direction transversely into the corresponding holding groove in front of the contact section. Transversely means here that the holding member is at first pushed in the insertion direction (or counter this direction) for example at the middle of the T-incision across its bottom and only at the predetermined depth (looking in the direction of the groove) is it pressed transversely into the groove, to the right or left, in front of the contact section.

Transversely here does not necessarily mean at a 90 degree angle to the groove, but can also mean a pressing in the forward direction, i.e., with an angle between 30 and 60 and especially 45 degrees, for example.

In configurations with an L-incision, i.e., only a one-sided holding groove, a further insertion direction can also be provided, namely, the sideways inserting of the positioning section or sections into the holding groove and a pressing of the other oppositely situated side elements of the electrical connection element into the incision at its side wall.

The holding members can be balls or cylinder sections, for example. In the case of cylinder sections, the one cylinder bottom can come to lie opposite the contact section, while the other cylinder bottom can be broken off at the edge of the contact body, so that the body can fill up the groove as far as the edge. However, it can also be shaped as a cube or a cuboid. The critical factors are an excessive dimension beyond the groove and a greater hardness with respect to the material of the first conductive element.

The electrical contact is in particular a flat contact having an incision and a one-sided or two-sided recess, or it is a bifurcated contact having two incisions situated opposite each other inside the bifurcate and having such one-sided or two-sided recesses. The incisions in the case of a one-sided recess can be called L-shaped incisions and in the case of a two-sided incision they can be called T-shaped incisions, because the L-shape or the T-shape pertains only to the basic appearance of the incision with a recess and not to the shape of the holding groove itself.

The holding grooves of the T-shaped incision need not be rectangular, they can also be round or triangular in cross section or correspond to a polygon, as long as the holding member pressed into these grooves has an excess dimension that prevents the holding member from being pushed out or falling out by the insertion as such or pressure from the side of the contact section.

Advantageously, two holding members per T-shaped incision are enough here, and these two holding members can be positioned in a T-shaped incision in the insertion direction and counter insertion direction in the same holding groove.

Alternatively, these two holding members can also be positioned in one holding groove in the insertion direction and in the other holding groove in the counter insertion direction.

In the case of an L-shaped incision, two holding members are positioned in the insertion direction and the counter insertion direction in this now single holding groove.

The individual incision with recess (in the case of an L-shaped incision) or one or both of the two incisions with recess (in the case of a T-shaped incision) need not have any continuous holding grooves. The holding grooves can be blind hole grooves, i.e., they end in the solid material of the first conductive element. This end of the groove then replaces the one holding member. Only at least one holding member is needed then, being inserted at the opposite side (in the insertion direction) of the contact section, and once again as indicated above this holding member can be inserted diametrically to the end wall of the holding groove in the case of a T-shaped incision.

A method for making such an electrical contact is characterized by the method steps of supplying the first contact section or sections of the electrical connection element or elements for contact with the first conductive element into the T-shaped incision at a predetermined distance from the side edges of the electrical contact, providing two, three or four holding members having a greater height than the height of the holding groove of the T-shaped incision, positioning at least one holding member at or within a predetermined distance in front of the first contact section in the insertion direction of the electrical connection element or elements in one of the holding grooves, and positioning at least one holding member in one of the holding grooves at or up to a predetermined distance in front of the first contact section in the counter insertion direction of the electrical connection element or elements.

Further embodiments are indicated in the dependent claims.

BRIEF DESCRIPTION OF THE DRAWINGS

Preferred embodiments of the invention shall be described in the following with the aid of the drawings, which merely serve as an illustration and should not be construed as being limiting. In the drawings.

DESCRIPTION OF PREFERRED EMBODIMENTS

Figure 1:
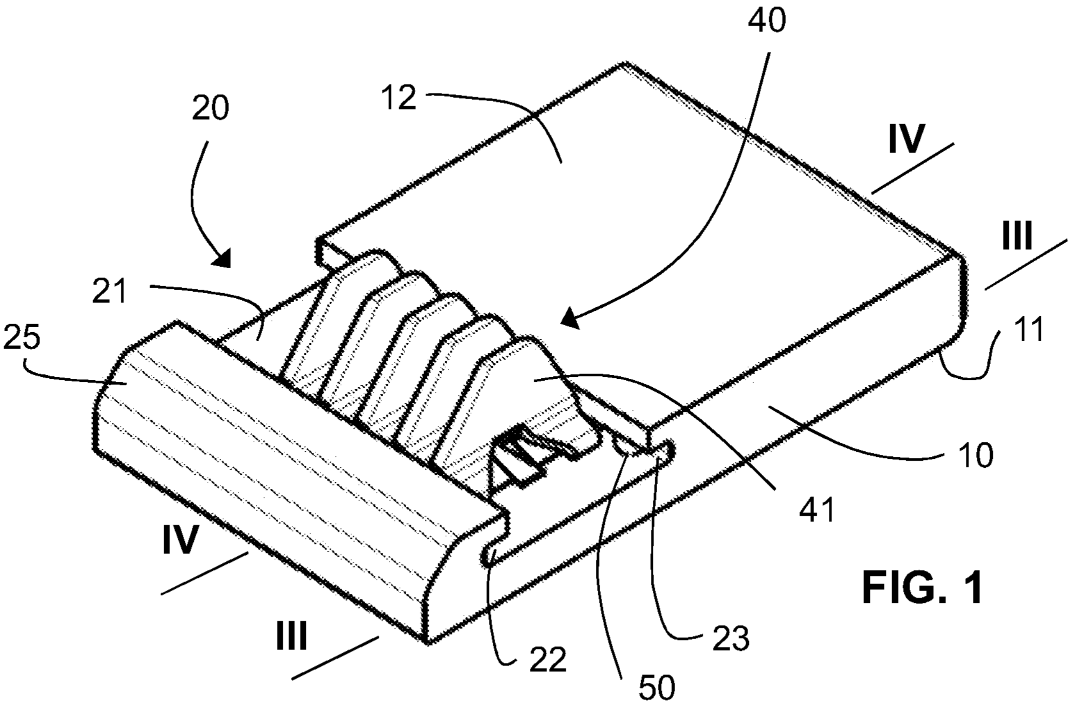
FIG. 1 shows a perspective view of a flat contact as a first conductive element with inserted electrical connection element and holding members in a T-incision.
Figure 2:
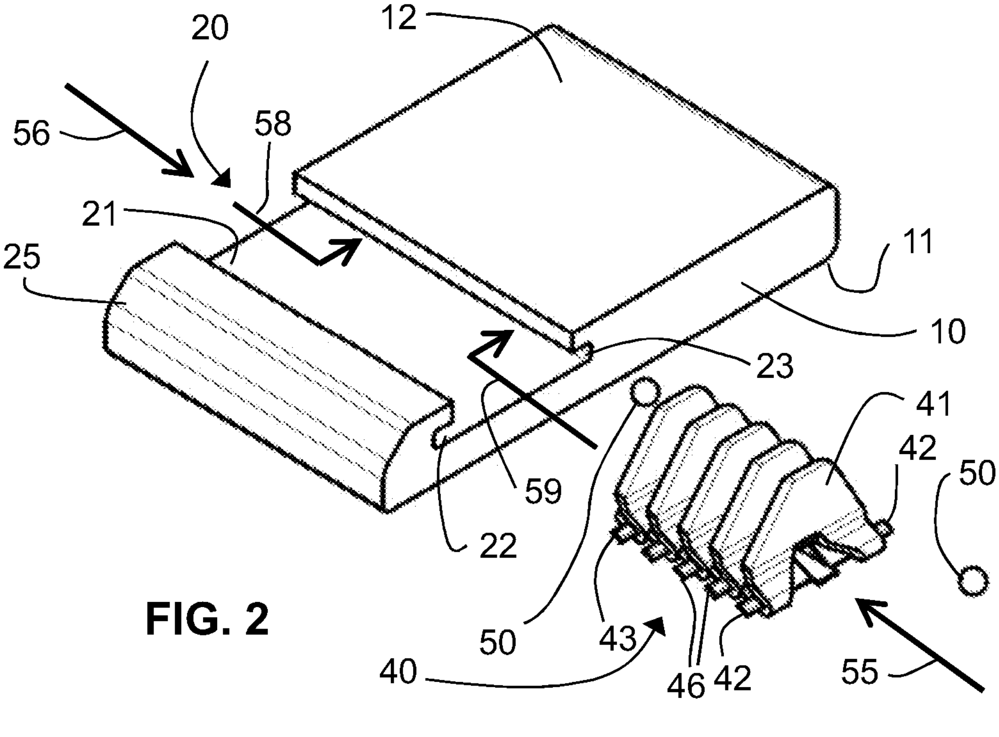
FIG. 2 shows a perspective exploded view of the flat contact of FIG. 1 with electrical connection element and holding members represented at the side in front of it.
Figure 3:
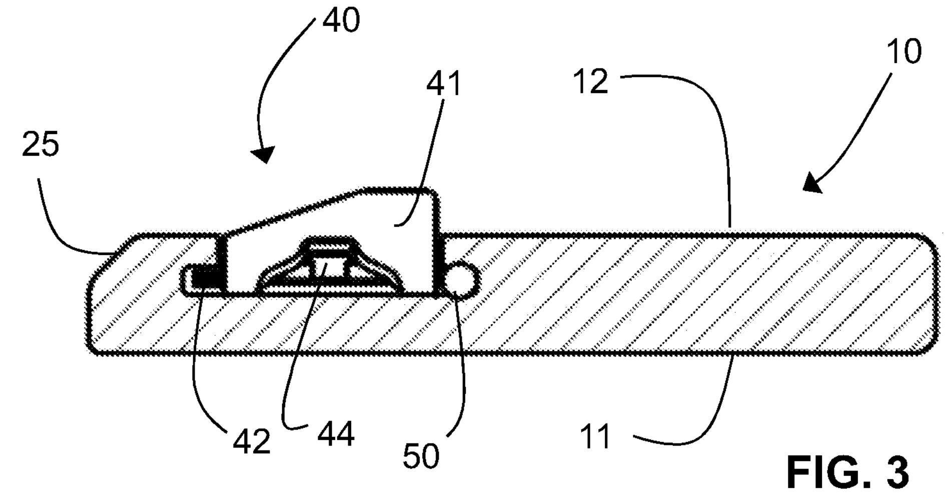
FIG. 3 shows a cross sectional view along line III-III of FIG. 1.
Figure 4:
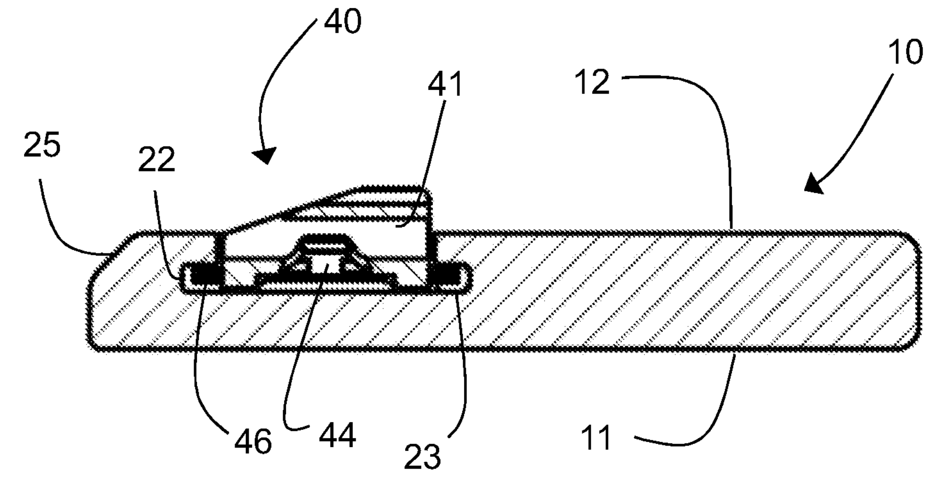
FIG. 4 shows a cross sectional view along line IV-IV of FIG. 1.

FIG. 1 shows a flat contact 10, being a first conductive element. This has a cuboidal shape in cross section with a bottom side 11 and a top side 12, oriented parallel to each other. FIG. 2 shows for the explanation a perspective exploded view of the flat contact 10 of FIG. 1 with electrical connection element 40 and holding members 50 represented at the side in front of it. Also used for the explanation are FIG. 3 with a cross sectional view along line III-III of FIG. 1 and FIG. 4 with a cross sectional view along line IV-IV of FIG. 1.

In the top side 12 of the flat contact 10 there is provided a holding groove 20, being configured as a T-incision. The holding groove 20 extends laterally, i.e., in the width direction of the bifurcated contact. We refer here briefly to FIG. 10, which shows a second electrical element 60, having been pushed forward for the contacting in an insertion direction 65 and covering the holding groove 20, at least in its end position, and thus covering the electrical connection element 40. The holding groove 20 has a flat bottom 21 and, as the name T-incision indicates, respective side holding grooves 22 and 23, which are designed as rectangular cavities in cross section in the insertion direction 65.

Figure 11:
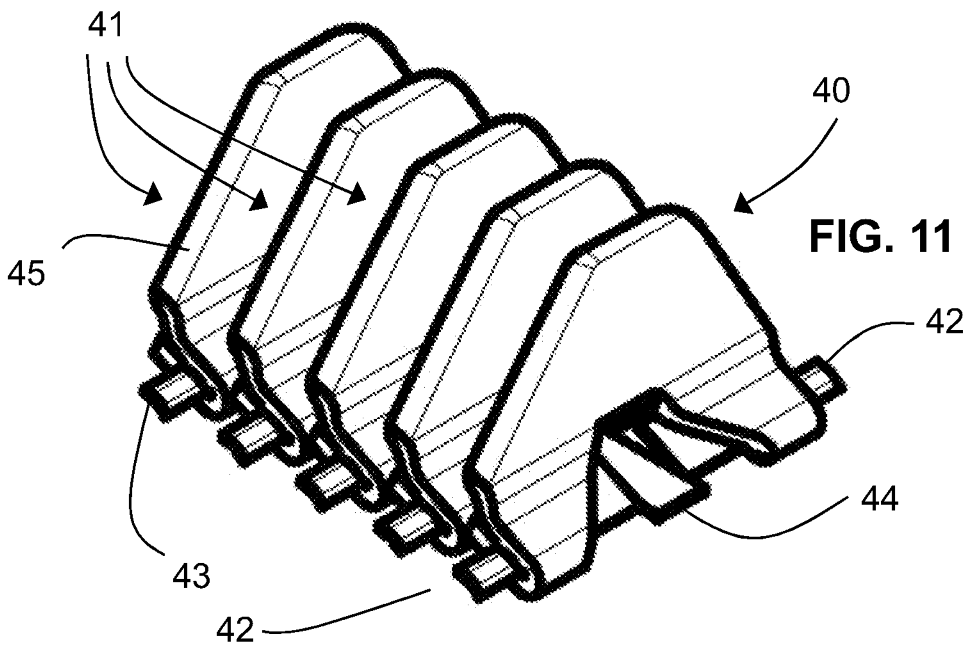
FIG. 11 shows an enlarged view, compared to the other figures, of the electrical connection element used in the embodiments of FIG. 1, FIG. 5 and FIG. 15.

The rectangular cavities serve for accommodating side webs 42, 43 of the electrical connection element 40. An electrical connection element 40 is represented in FIG. 11. Here, this electrical connection element 40 has five lamellas 41; but also any other number from 1 to X can be provided, the number depending on the length of the holding groove 20 (and that of the holding members 50 yet to be explained). X will seldom be larger than twenty, although there is no upper limit.

In other words, the holding grooves 22 and 23 have flange sections projecting beyond the bottom 21 transversely to the insertion direction 65, here also designated as: in an insertion direction 55, which are formed at the opening side on the left in FIG. 1 and at the rear side on the right in FIG. 1 of the receiving groove or holding groove 20.

In the first embodiment, the flange sections delimit the side webs of each of the electrical connection elements 40 inserted in an insertion direction 55, so that the electrical connection elements 40 cannot fall out from the holding grooves 22 and 23. The side webs have the general reference number 46, while the frontmost side web has the reference number 42 and the rearmost side web has the reference number 43. These side webs can also be called teeth, while a pair of these teeth at left and right each carry one lamella 41 of the connection element 40.

The familiar problem of the prior art occurs here: the electrical connection elements must be prevented from falling out of the holding groove 20, any movement in their insertion direction being possible as free play or alternatively being entirely prevented. This is prevented here by the pressing of holding members 50 into the right hand groove or rectangular cavity 23 (in this case) in the insertion direction 55 and in a counter insertion direction 56.

After the positioning of the electrical connection element 40 as shown in FIG. 1, a first holding member 50 is pushed into the groove 23 in the insertion direction 55, until it abuts against the frontmost side web 42 of the first electrical connection element 40 in the insertion direction. At the same time, or after this, a second holding member 50 is pushed forward in the opposite direction, i.e., in the counter insertion direction 56 into the groove 23, likewise as far as the rearmost side web 43 of the electrical connection element 40. The group of lamellas 41 of the electrical connection element 40 are then secured and can only still move in such a way as results from the greater inclination of the electrical connection element 40 when inserting the second electrical element 60.

The holding members 50 of the present embodiment are solid metal balls with a slightly larger diameter than the height of the groove 23. Instead of being pressed into the groove 23 in the forward direction, they can also be pressed in sideways from the bottom 21, in the present instance to the right, directly in front of the web 42. They provide a force closure.

One major characteristics of the holding members 50 is their greater hardness than that of the material of the body of the flat contact 10.

Instead of being pushed forward up to the first/last web 42/43 of the electrical connection element 40, the holding members 50 can also leave a predetermined spacing from each other, resulting from the known spacing of the two webs 42/43 from each other and an additional predetermined free play distance.

In other exemplary embodiments, the two holding members 50 alternatively can both be pressed into the right hand groove 22 or they can hold the electrical connection elements 40 by a diagonal pressing of one metal ball 50 into the groove 23 from the right front side and one metal ball 50 into the groove 22 from the left rear side, or vice versa. In any case, it is sufficient to use two holding members 50.

Instead of metal balls, other forms of the holding members 50 are also possible to achieve a force closure by overdimensioning with respect to the receiving grooves 22/23, such as rods, especially cylindrical rods, which are pushed into the grooves 22/23. It is important for these elements to lie entirely in the guide grooves 22/23 of the flat contact 10 and not protrude beyond the side wall. Basically, it would also be possible to introduce a corresponding cylindrical pin and break it off at the front side of the flat contact 10, so that it is entirely in the respective groove 22/23 and does not protrude. In this case, the holding member is then a rod pushed lengthwise in one or both grooves 22/23. This replaces one ball in one groove.

Alternatively, in the case of a T-incision, a cross bar appropriately overdimensioned with respect to the receiving grooves 22/23 (not shown in the figure) can be pushed up to the predetermined location in the two oppositely situated grooves in the direction 55 or 56 of the groove bottom 21. In this way, for example in relation to FIG. 2, the positioning of the first 42 or last 43 web would be overdetermined, since one ball 50 as the holding member in front of and one ball 50 behind the connection element 40 is sufficient. In the case of a cross bar, the frontmost 42 or rearmost 43 web is locked in its two grooves 22 and 23. One advantage of the cross bar is that the excess dimension can also involve the width of the incision, so that this cross bar is not only greater in height than the respective groove 22 and 23 but can also exceed the width of the overall incision in its length. The cross bar can also be inserted at first in a groove and then pushed forward at an angle of 45 degrees, for example, and when it reaches the end position in a groove it can also be placed in position in the other groove by swiveling around this point as a swiveling point into the transverse position.

Finally, the "pressing in" of the holding members 50 can involve not only a direct longitudinal pressing into and through the groove 23 up to the position shown in FIG. 1, but also a sideways pressing from the center of the T-incision 20 according to the arrow 59, which also defines here an alternative "insertion direction" 59. Since the holding members 50 have an excess dimension in their height beyond the groove 22 or 23, a pressing directly in the arrow direction 55 or in the opposite direction 56 is demonstrable by the deformation of the groove 22 or 23 and constitutes a physical characteristic, as does the positioning in the alternative insertion direction 59. The alternative counter insertion direction 58 then exists in place of the counter insertion direction 56.

Figure 5:
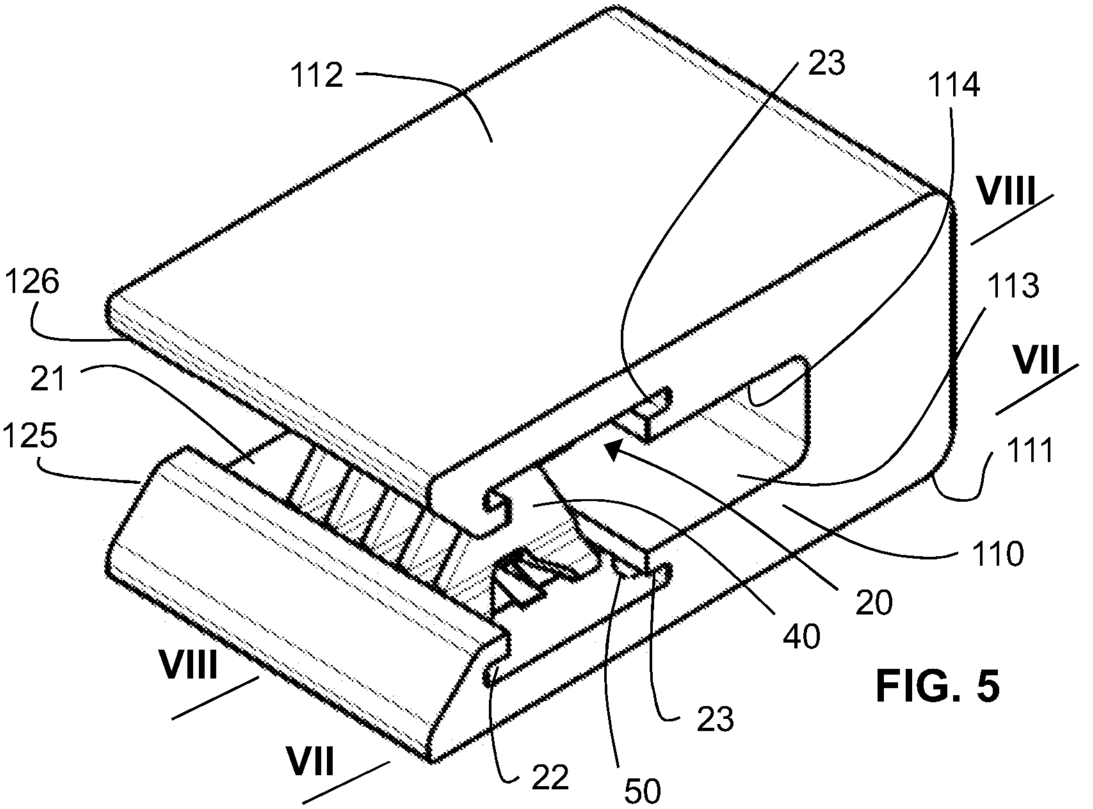
FIG. 5 shows a perspective view of a bifurcated contact as a first conductive element with inserted electrical connection element and holding members each in a T-incision.
Figure 6:
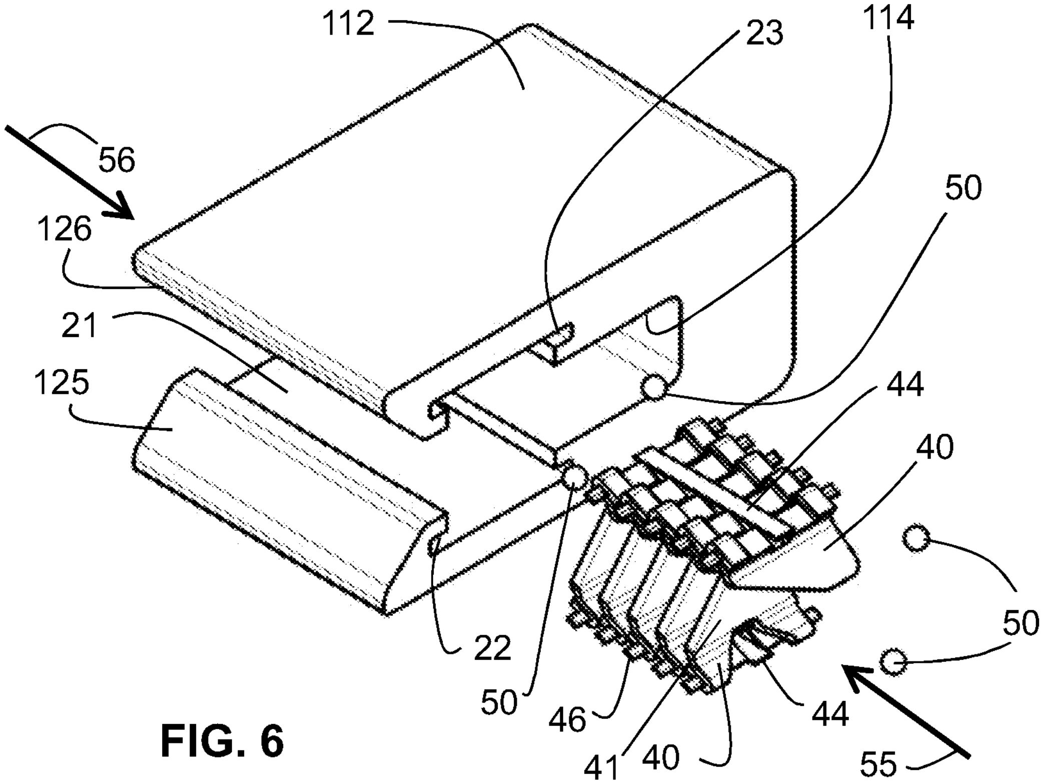
FIG. 6 shows a perspective exploded view of the flat contact of FIG. 5 with electrical connection element and holding members represented at the side in front of it.
Figure 7:
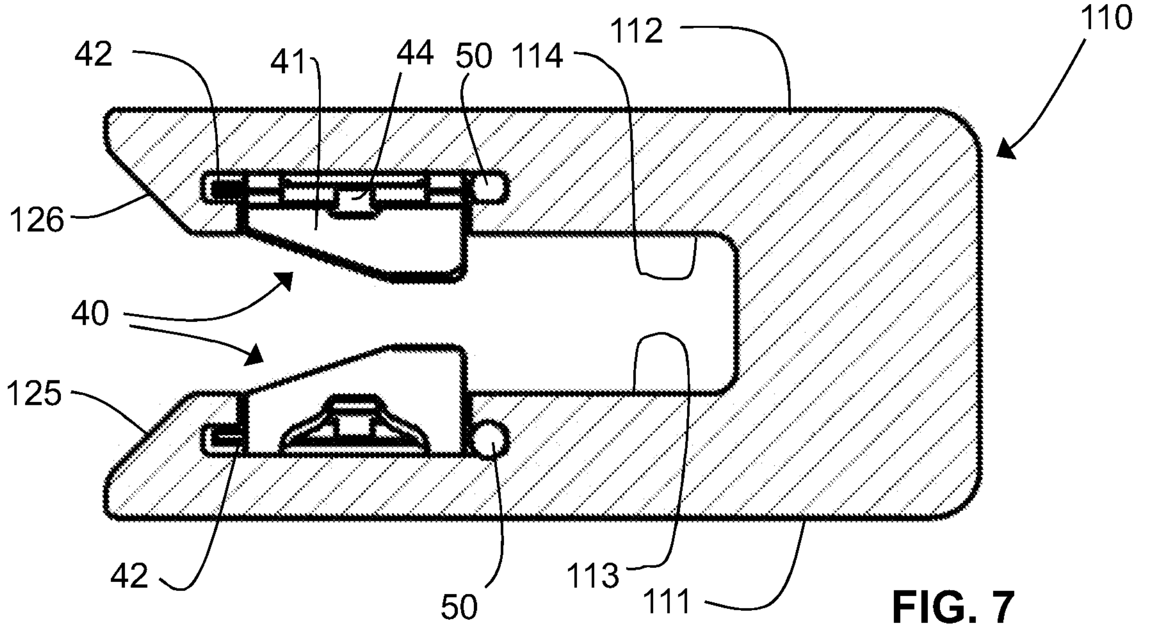
FIG. 7 shows a cross sectional view along line VII-VII of FIG. 5.
Figure 8:
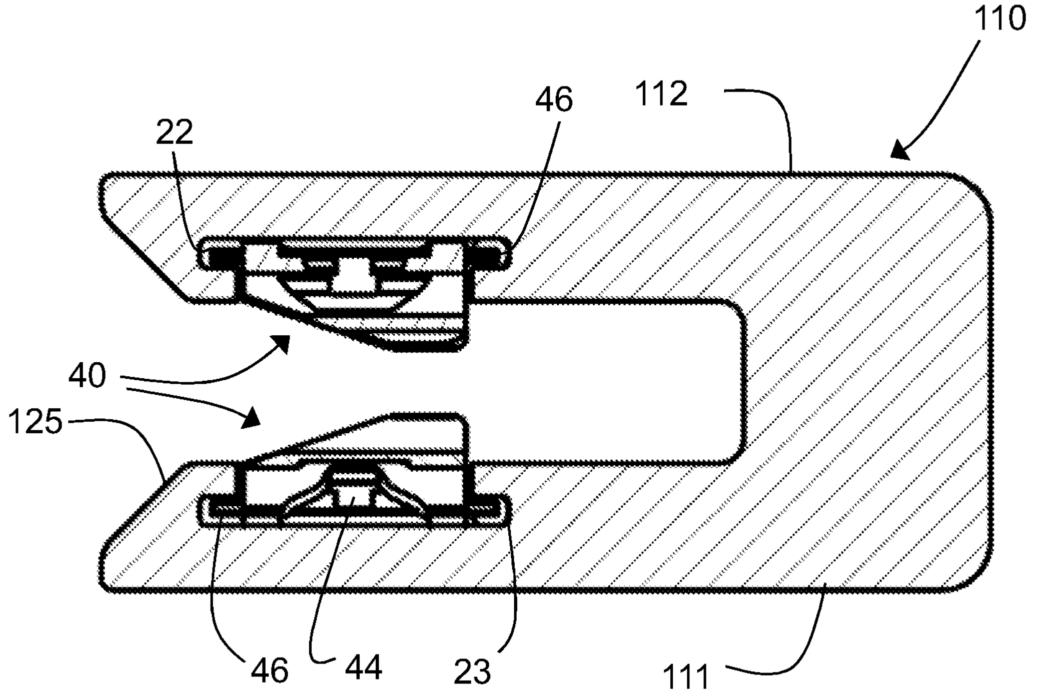
FIG. 8 shows a cross sectional view along line VIII-VIII of FIG. 5.

FIG. 5 shows a bifurcated contact 110, which is the first conductive element. This has the shape of a C in cross section with a bottom side 111, a top side 112 and an upper inner surface 114 and a lower inner surface 113, which are oriented parallel to each other. FIG. 6 shows a perspective exploded view of the bifurcated contact 110 of FIG. 5 for elucidation with the electrical connection element 40 and the holding members 50 represented at the side in front of it. For the explanation of this, we shall make use of FIG. 7 with a cross sectional view along line VII-VII of FIG. 5 and FIG. 8 with a cross sectional view along line VIII-VIII of FIG. 5.

All of the features given the same reference number in FIGS. 5 to 8 as those in FIGS. 1 to 4 are identical in design and unless otherwise described here reference is made to the above description of FIGS. 1 to 4, briefly put: the same features have the same reference number.

A holding groove 20 is provided in each of this upper inner surface 114 and this lower inner surface 113 of the bifurcated contact 110, being configured as a T-incision. The two holding grooves 20 lie opposite each other in the upper inner surface 114 and in the lower inner surface 113.

Figure 15:
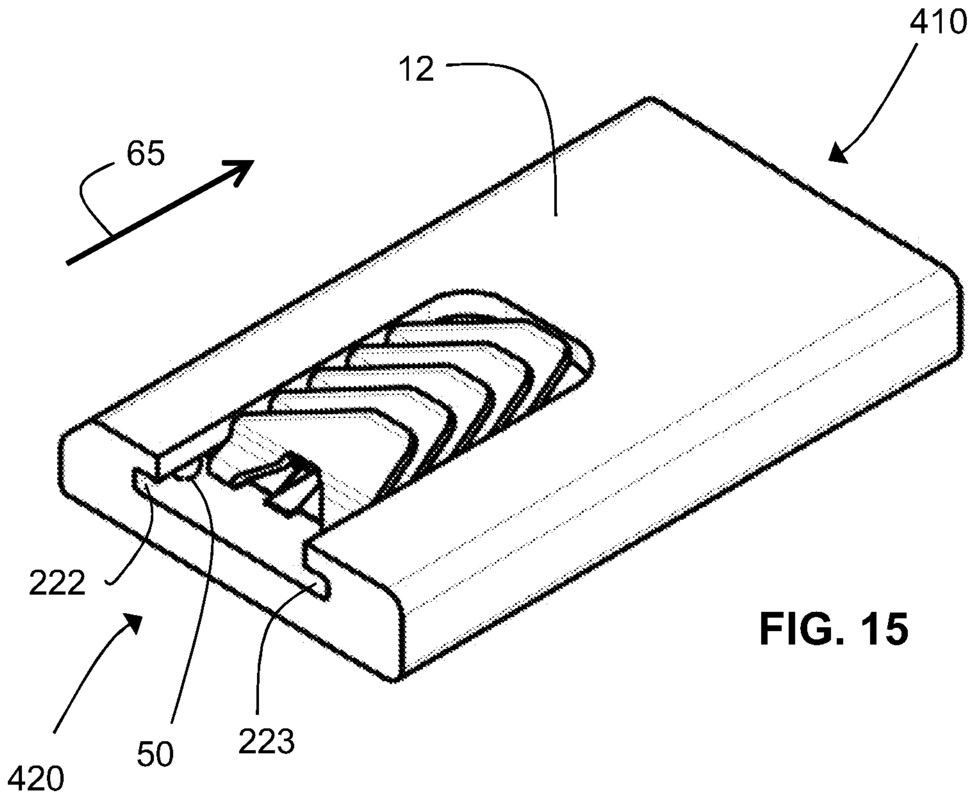
FIG. 15 shows a perspective view of a flat contact as a first conductive element with inserted electrical connection element and a holding member in a non-continuous T-incision.
Figure 16:
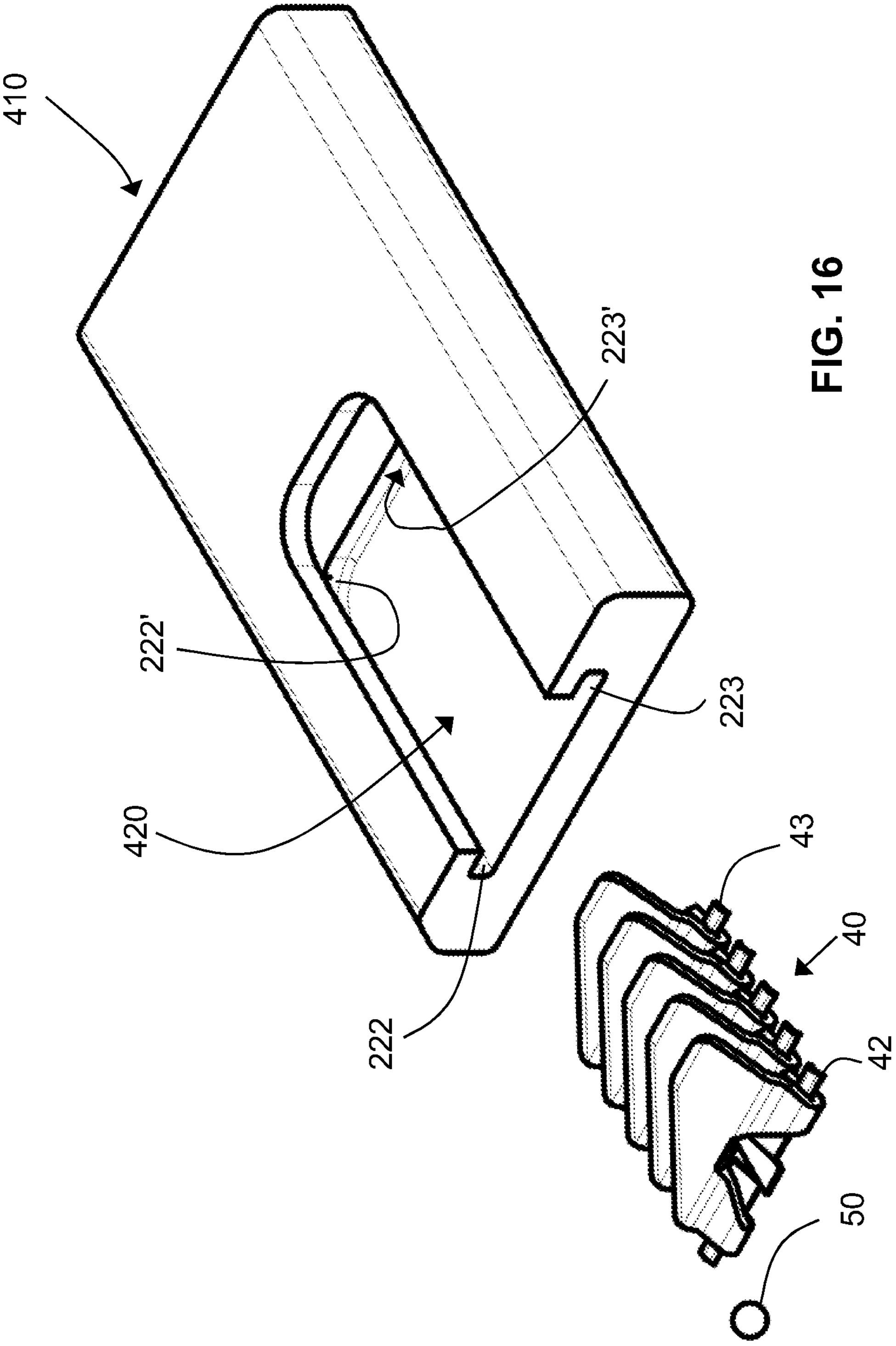
FIG. 16 shows a perspective exploded view of the flat contact of FIG. 15 with electrical connection element and holding member represented at the side in front of it.

The two holding grooves 20 extend sideways in FIG. 5, i.e., in the width direction of the bifurcated contact, while in the embodiment of FIGS. 15 and 16 they extend in the longitudinal direction. The holding grooves 22 each have a flat bottom 21 and side holding grooves 22 and 23, as the name of T-incision suggests, being configured as rectangular cavities in cross section in the insertion direction 65.

The rectangular cavities serve for accommodating side webs 46 of the electrical connection elements 40. In other words, the holding grooves 22 and 23 have flange sections protruding beyond the bottom 21, transversely to the insertion direction 65, being formed at the opening side of the receiving groove or holding groove 20 at left in FIG. 5 and at the rear side at right in FIG. 5.

In the second embodiment, the flange sections delimit the two side webs 42 of each of the two electrical connection elements 40 inserted, so that the electrical connection elements 40 cannot fall out from the holding grooves 22 and 23. In other words, the electrical connection elements 40 are to be pushed in from the side running transversely to the direction 65 of FIG. 9, i.e., in the insertion direction 55. The side webs 46 are connected to a continuous middle web 44 as a holding band, so that the side webs can be seen as teeth extending in comb fashion to the left from the middle web. The lamellas of the electrical connection element 40 here are mechanically connected to the holding band, as described in the context of FIG. 11. In other exemplary embodiments not shown, the fastening of the lamellas 41 can be done differently; important is the presence of at least one-sided teeth or side webs (see the configuration of FIG. 12) as positioning sections for the holding grooves, left and right, left or right, or on one side.

As in the first exemplary embodiment, the connection elements 40 are fixed in their position in the respective T-incision 20 at top and bottom by pressing holding members 50 into the right hand groove or rectangular cavity 23 (in the present case) and prevented from falling out. Therefore, the four holding members 50 are arranged here in FIG. 6 at the right of the two connection elements 40 positioned upside down. They will all be inserted in the insertion direction 55 or in the counter insertion direction 56, while the alternative insertion direction 59 is also possible.

Figure 9:
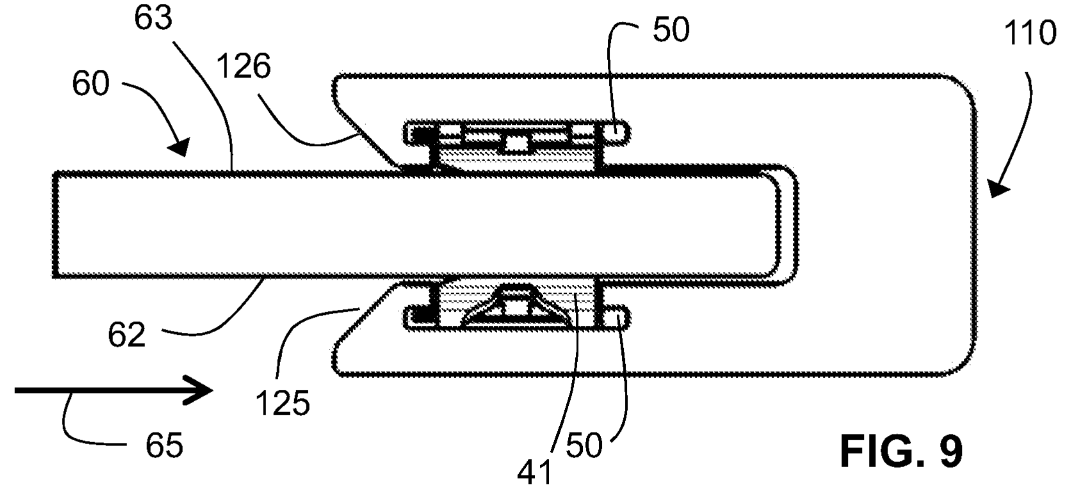
FIG. 9 shows a side view of FIG. 5 with additional inserted second conductive element.

After the positioning of the electrical connection elements 40 as shown in FIG. 5, a first holding member 50 is pushed forward in the insertion direction 55 into the lower groove 23 (for example), until it abuts against the frontmost side web 42 of the first electrical connection element 40 in the insertion direction. At the same time or after this, a second holding member 50 is pushed forward in the opposite direction 56 into the lower groove 23 likewise as far as the rearmost side web 43 of the electrical connection element 40. At the same time or after this, the holding members 50 for the other connection element 40 are pushed into the upper groove 23. The electrical connection elements 40 are then secured and can only still move in such a way as results from the greater inclination of the electrical connection elements 40 when inserting the second electrical element 60, as shown in FIG. 9.

Here as well, instead of being pushed forward up to the first/last web 42/43 of the electrical connection element 40, the holding members 50 can also be placed at a predetermined spacing from each other, resulting from the known spacing of the frontmost and rearmost webs 42 and 43 from each other as positioning sections and an additional predetermined free play distance. This can be handled in the same way for the upper and lower connection element 40, that is, no play or play for both of them.

In other exemplary embodiments, the two holding members 50 of each connection element 40 (top or bottom) alternatively can both be pressed into the right hand groove 22 or the electrical connection elements 40 can be secured by a diagonal pressing of one metal ball 50 into the groove 23 from the right front side and one metal ball 50 into the groove 22 from the left rear side, or vice versa. In any case, it is sufficient to use two holding members 50 for each connection element 40.

Instead of metal balls, other forms of the holding members 50 are also possible here to achieve a force closure by overdimensioning with respect to the receiving grooves 22/23. In the region of the height and the movement of the holding members 50 in this direction, a form fit with excess dimension exists, the function being dictated by the force closure made possible by this excess dimension in form fit in the insertion direction 55 or in the counter insertion direction 56, which limits the movement of the connection elements 40 entirely or to a free play.

Figure 10:
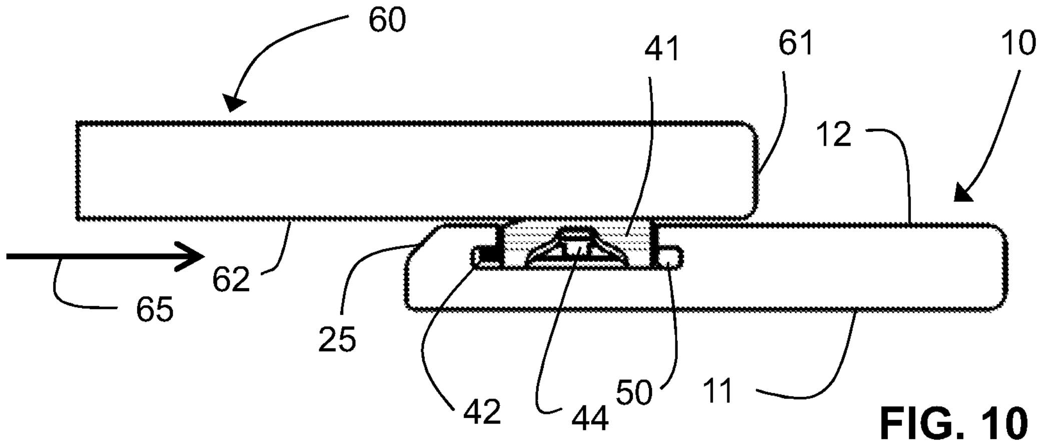
FIG. 10 shows a side view of FIG. 1 with additional inserted second conductive element.

FIG. 9 shows a side view of FIG. 5 with additional inserted second conductive element 60 and FIG. 10 shows a side view of FIG. 1 with likewise additional inserted second conductive element 60. The function of the front inclined edges 25 or 125 and 126 of the flat contact 10 or the bifurcated contact 110 will be clear, namely, they make it easier to push the second conductive element 60, then closing the contact, onto the top side 12 or between the lower and upper inner side 113 and 114 in the insertion direction. In this process, it also becomes evident that the connection elements 40 become bent in the transverse direction when they are pivoted by the second conductive element 60 about the axis dictated by the side webs 46 of the holding band 44 when the second conductive element runs against the run-up edge 45 of the connection elements 40. Little or no additional forces are exerted by the side webs 42 on the holding members 50 in this process, but instead the side webs 42 are at most tilted in the grooves 22 and 23. It is clear that, in the embodiment of FIG. 10, the contact element 60 can be brought up to the contact elements 41 from any direction, and a slanted edge 45 is advantageously available as run-up edge.

In order to illustrate one possible group of five lamellas of a connection element 40, FIG. 11 shows an enlarged view, compared to the other figures, of the electrical connection element 40 used in the embodiments of FIGS. 1, 5 and 15. The lamellas 41 have an edge 45 slanted towards the insertion direction, it being clear from FIG. 6 that the pivoting movement about the axis dictated by the side webs 46 occurs in mutually opposite directions in the bifurcated contact. The lamellas 41 of the connection elements 40 are preferably already slanting in one direction in the insertion direction, so that a further pivoting is performed upon pushing the second conductive element 60 forward.

The body of the flat contact 10 or the bifurcated contact 110 is made of conductive metal. The holding members 50 can likewise be made of metal. They must have an excess dimension beyond the height of the corresponding groove 22, 23 at least at the positioning location and become plastically deformed when pressed in. The deformation is also demonstrable on the surfaces of the groove 22, 23 when they are pressed directly into the recess.

Figure 12:
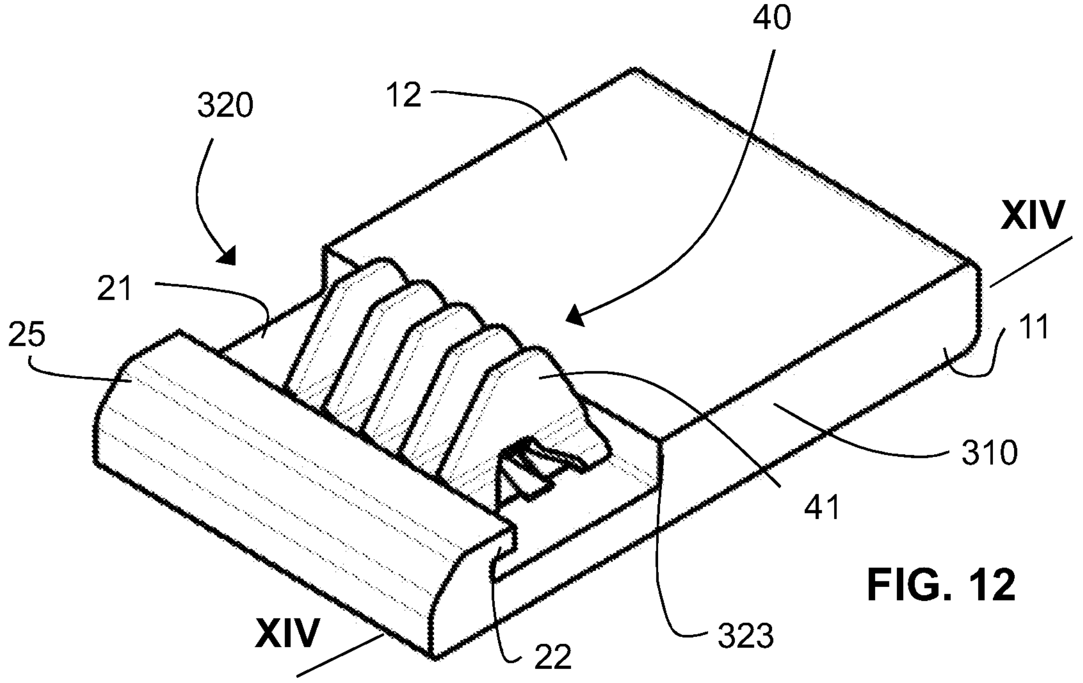
FIG. 12 shows a perspective view of a flat contact as a first conductive element with inserted electrical connection element in an L-incision.
Figure 13:
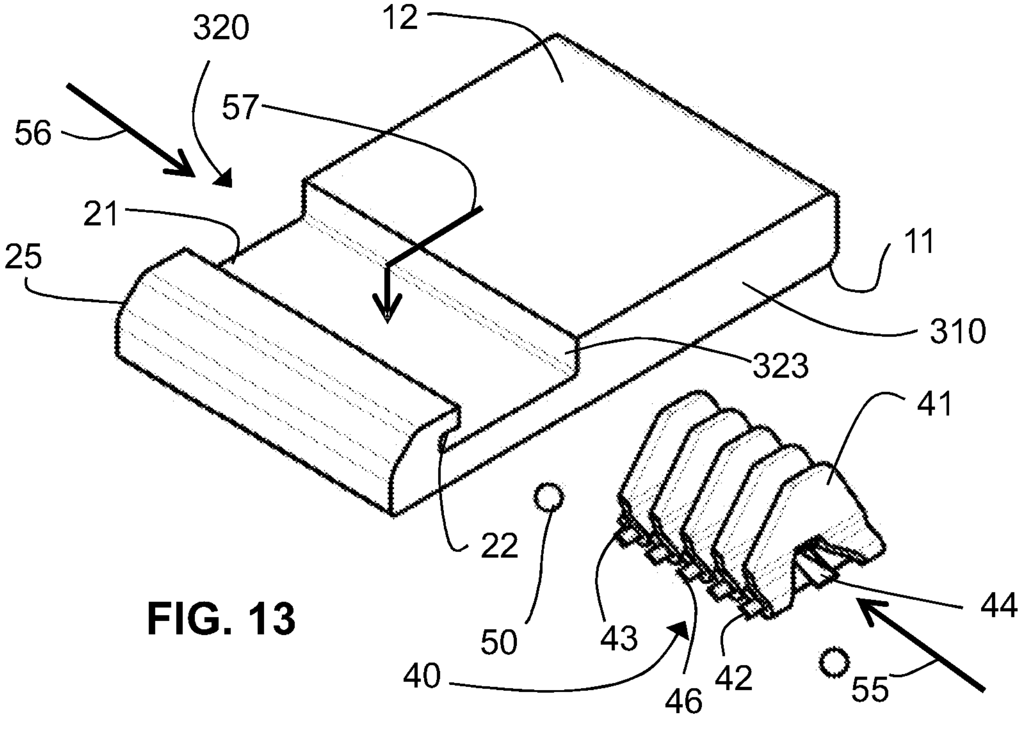
FIG. 13 shows a perspective exploded view of the flat contact of FIG. 12 with electrical connection element and holding members and different installation directions represented at the side in front of it.
Figure 14:
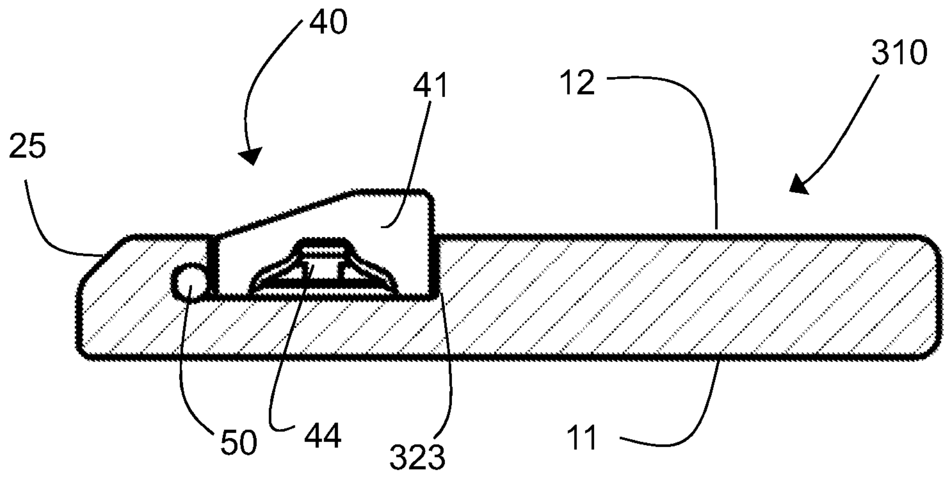
FIG. 14 shows a cross sectional view along line XIV-XIV of FIG. 12.

FIG. 12 shows another flat contact 310, involving a first conductive element. This has a cuboid shape in cross section with a bottom side 11 and a top side 12, oriented parallel to each other. FIG. 13 shows for illustration a perspective exploded view of the flat contact 310 of FIG. 12 with electrical connection element 40 and holding members 50 represented at the side in front of it. Also used for the explanation is FIG. 14 with a cross sectional view along line XIV-XIV of FIG. 12.

The difference between the flat contact 10 of FIG. 1 and the flat contact 310 of FIG. 12 is that the holding groove 320 is an L-incision, i.e., a one-sided groove 22 with a side wall situated transversely to the longitudinal direction of the groove 22. In other embodiments, of course, there can be a groove situated on the right as depicted in FIG. 12 and a side wall then situated at the left, although the configuration shown in the drawing is preferred when introducing the second conductive element 60 across the slanted run-up surface 25.

The holding band 44 of the connection element 40 here is provided with teeth or side webs 46 in comblike fashion only on one side, and the frontmost left side web 42 and the rearmost side web 43 are once again blocked by the holding members 50. Both holding members 50 here must be introduced in the single groove.

In addition to the insertion directions 55 and 56, the possibility also exists here for a further insertion direction, indicated by reference number 57, involving a lateral insertion of the side webs 46 into the groove 22 followed by a pressing from the top of the connection element 40 onto the bottom 21 of the holding groove 320.

FIG. 15 shows another flat contact 410, which is a first conductive element. This has a cuboid shape in cross section with a bottom side 11 and a top side 12, oriented parallel to each other. The holding groove 420 is oriented here in the longitudinal direction. Longitudinal direction means here that the insertion direction of the second conductive element 60, as shown in FIGS. 9 and 10, is oriented in the longitudinal direction of the holding groove 420. FIG. 16 shows for illustration a perspective exploded view of the flat contact 410 of FIG. 15 with electrical connection element 40 and holding members 50 represented at the side in front of it.

The embodiment of FIGS. 15 and 16 shows a blind hole groove having a left blind hole groove 222 and a right blind hole groove 223. These end in the solid material of the flat contact body at a groove rear wall 222' or 223'. This provides an end stop for the rearmost side web pair 43, replacing the holding member. It is then sufficient, as shown in the exemplary embodiment, to position one holding member 50 in front of one of the frontmost side webs 42, left or right. The ball as a holding member 50 is shown here at left.

It is also possible for the blind hole grooves 222 and 223 to end in fact at a rear wall 222' and 223' and thus the T-incision comes to an end, but the holding groove 420 with the flat bottom continues on to the opposite situated side wall of the flat contact 410. The positioning is done here analogously to the above representation for FIG. 16.

It is clear that all sixteen possibilities for the arrangement of the following four features should be covered with the invention.

- transverse direction or longitudinal direction of the groove (FIG. 1, 5, 12 versus FIG. 15)
- continuous groove or blind hole groove (FIG. 1, 5, 12 versus FIG. 15)
- T-incision versus L-incision (FIG. 1, 5, 15 versus FIG. 12)
- Flat contact or bifurcated contact (FIGS. 1, 12 and 15 versus FIG. 5)

where furthermore the above explained freedom of arrangement of the holding members 50 at left and/or at right partially exists, with or without free play, as balls, longitudinal bars, or cross bars, advantageously not extending beyond the outer side walls of the contacts and wherein a holding member having an at least one-sided blind hole can also be formed by its rear wall 222', 223'.

LIST OF REFERENCE SIGNS

| | |
|---|---|
| 10 | Flat contact; first conductive element, with T-incision |
| | Bottom side |
| 12 | Top side |
| 20 | T-incision |
| | Bottom |
| 11 | Rectangular cavity; holding groove |
| 23 | Rectangular cavity; holding groove |
| 25 | Inclined run-up surface |
| 40 | Electrical Connection element |
| 41 | Lamella |
| 42 | Frontmost side web |
| 43 | Rearmost side web |
| 44 | Middle web |
| 45 | Run-up edge |
| 46 | Side web |
| 50 | Holding member/metal ball; cylinder section |
| 55 | Insertion direction |
| 56 | Counter insertion direction |
| 57 | Further insertion direction |
| 58 | Alternative counter insertion direction |
| 59 | Alternative insertion direction |
| 60 | Conductor contact; second conductive element |
| 61 | Front side of conductor contact |
| 62 | Bottom side of conductor contact |
| 63 | Top side of conductor contact |
| 65 | Insertion direction |
| 110 | Bifurcated contact; first conductive element, with T-incision |
| 111 | Bottom side |
| 112 | Top side |
| 113 | Lower inner surface |
| 114 | Upper inner surface |
| 125 | Lower inclined run-up surface |
| 126 | Upper inclined run-up surface |

-continued

| LIST OF REFERENCE SIGNS | |
|---|---|
| 210 | Flat contact, first conductive element, with T-incision and blind hole grooves |
| 220 | T-incision with blind hole grooves |
| 222 | Holding groove with rear wall |
| 222' | Groove rear wall |
| 223 | Holding groove with rear wall |
| 223' | Groove rear wall |
| 310 | First conductive element, with L-incision |
| 320 | L-incision |
| 323 | Side wall of incision |
| 410 | Flat contact, first conductive element, with lengthwise running T-incision and blind hole grooves |
| 420 | Lengthwise running T-incision |

The invention claimed is:

1. An electrical contact having a first conductive element, having an electrical connection element for contacting of the first conductive element and configured for contacting of a second conductive element which can be supplied and having at least one holding member for holding the electrical connection element on the first conductive element, wherein the first conductive element has at least one incision in a surface facing toward the second conductive element which can be supplied, wherein the electrical connection element has at least one frontmost and one rearmost positioning section for positioning in an assigned holding groove of the incision of the first conductive element and a contact section for contact with the second conductive element which can be supplied outside the incision, wherein one to four holding members are provided, each of which has a greater height than a height of the holding groove(s) of the incision assigned to them, wherein at least one holding member is positioned at or within a predetermined distance in front of the frontmost positioning section of the electrical connection element in one of the holding grooves, and either wherein at least one holding member is positioned at or up to a predetermined distance behind the rearmost positioning section of the electrical connection element in one of the holding grooves, or wherein one of the holding grooves is a blind hole groove having a rear wall and wherein the rearmost positioning section of the electrical connection element is positioned at or within a predetermined distance in front of the rear wall of the blind hole groove in this blind hole groove.

2. The electrical contact as claimed in claim 1, wherein the holding member does not project beyond a side wall of the first conductive element in the holding groove.

3. The electrical contact as claimed in claim 2, wherein either the positioning of the electrical connection element is done by pressing the holding member or members into the holding groove in a direct insertion direction or a counter insertion direction, or wherein the positioning of the electrical connection element is done by pressing the holding member into the holding groove from a side of an insertion direction or a counter insertion direction transversely into the respective holding groove in front of the contact section.

4. The electrical contact as claimed in claim 1, wherein either the positioning of the electrical connection element is done by pressing the holding member or members into the holding groove in a direct insertion direction or a counter insertion direction, or wherein the positioning of the electrical connection element is done by sideways pressing the holding member from the incision into the holding groove from a side of an insertion direction or a counter insertion direction transversely into the respective holding groove in front of the corresponding positioning section.

5. The electrical contact as claimed in claim 1, wherein the holding members are chosen from a group of balls, cylinder sections, cones and cubes.

6. The electrical contact as claimed in claim 1, wherein the holding members are chosen from a group of balls, cylinder sections, cones and cubes, wherein either the positioning of the electrical connection element is done by pressing the holding member or members into the holding groove in a direct insertion direction or a counter insertion direction, or wherein the positioning of the electrical connection element is done by pressing the holding member into the holding groove from a side of an insertion direction or a counter insertion direction transversely into the respective holding groove in front of the contact section.

7. The electrical contact as claimed in claim 1, wherein the holding member does not project beyond a side wall of the first conductive element in the holding groove, wherein the holding members are chosen from a group of balls, cylinder sections, cones and cubes, wherein either the positioning of the electrical connection element is done by pressing the holding member or members into the holding groove in a direct insertion direction or a counter insertion direction, or wherein the positioning of the electrical connection element is done by pressing the holding member into the holding groove from a side of an insertion direction or a counter insertion direction transversely into the respective holding groove in front of the contact section.

8. The electrical contact as claimed in claim 1, wherein the electrical contact is a flat contact with an incision.

9. The electrical contact as claimed in claim 1, wherein the electrical contact is a bifurcated contact having two incisions situated opposite to each other in an interior of the bifurcation.

10. The electrical contact as claimed in claim 1, wherein the incision is a T-shaped incision, wherein two holding members are provided for each T-shaped incision, and wherein these two holding members are positioned in a T-shaped incision in the same holding groove.

11. The electrical contact as claimed in claim 1, wherein the incision is a T-shaped incision, wherein two holding members are provided for each T-shaped incision, and wherein these two holding members are positioned in a T-shaped incision in the other holding groove.

12. The electrical contact as claimed in claim 1, wherein the incision is an L-shaped incision, wherein two holding members are provided for each L-shaped incision, which are positioned in the single holding groove.

13. The electrical contact as claimed in claim 1, wherein the incision is situated transversely to a supplying direction of the second conductive element which can be supplied.

14. The electrical contact as claimed in claim 1, wherein the incision is situated in a longitudinal direction to a supplying direction of the second conductive element which can be supplied.

15. A method for making an electrical contact having a first conductive element, having an electrical connection element for contacting of the first conductive element and configured for contacting of a second conductive element which can be supplied and having at least one holding member for holding the electrical connection element on the first conductive element, wherein the first conductive element has at least one incision in a surface facing toward the second conductive element which can be supplied, wherein the electrical connection element has at least one frontmost and one rearmost positioning section for positioning in an assigned holding groove of the incision of the first conductive element and a contact section for contact with the second conductive element which can be supplied outside the incision, wherein one to four holding members are provided, each of which has a greater height than a height of the holding groove(s) of the incision assigned to them, wherein at least one holding member is positioned at or within a predetermined distance in front of the frontmost positioning section of the electrical connection element in one of the holding grooves, and either wherein at least one holding member is positioned at or up to a predetermined distance behind the rearmost positioning section of the electrical connection element in one of the holding grooves, or wherein one of the holding grooves is a blind hole groove having a rear wall and wherein the rearmost positioning section of the electrical connection element is positioned at or within a predetermined distance in front of the rear wall of the blind hole groove in this blind hole groove, wherein the method comprises method steps of supplying the positioning section or sections of the electrical connection element for contact with the first conductive element into the incision at a predetermined distance from side edges of the first conductive element, providing at least one holding member having a greater height than the height of the holding groove(s) of the incision assigned to it, positioning the at least one holding member at or within a predetermined distance in front of the first positioning section of the electrical connection element in one of the holding grooves and either positioning at least one holding member at or up to a predetermined distance behind the rearmost positioning section in one of the holding grooves of the electrical connection element or positioning the rearmost positioning section of the electrical connection element at or within a predetermined distance from the rear wall of the blind hole groove in this blind hole groove.

16. The method as claimed in claim 15, wherein the step of positioning the electrical connection element or elements in an insertion direction or in a counter insertion direction is done by pressing the holding member into the holding groove in a direct insertion direction or the counter insertion direction.

17. The method as claimed in claim 15, wherein the step of positioning the electrical connection element or elements in an insertion direction or in a counter insertion direction is done by sideways pressing the holding member from the incision into the holding groove from a side of the insertion direction or the counter insertion direction transversely into the corresponding holding groove in front of the corresponding positioning section.

18. The method as claimed in claim 15, wherein the holding members are cylinder sections, one cylinder bottom of which is positioned at a predetermined position at or in front of the assigned positioning section, while an oppositely situated cylinder bottom is positioned inside or up to an edge of the holding groove in front of a side wall of the first conductive element.

19. The method as claimed in claim 15, wherein the holding members are chosen from a group of balls, cylinder sections, cones and cubes.

* * * * *